Nov. 13, 1962 M. PREFONTAINE 3,063,155
COMBINATION SINE BAR AND INDEXING ROTARY TABLE
Filed Jan. 6, 1961 3 Sheets-Sheet 1
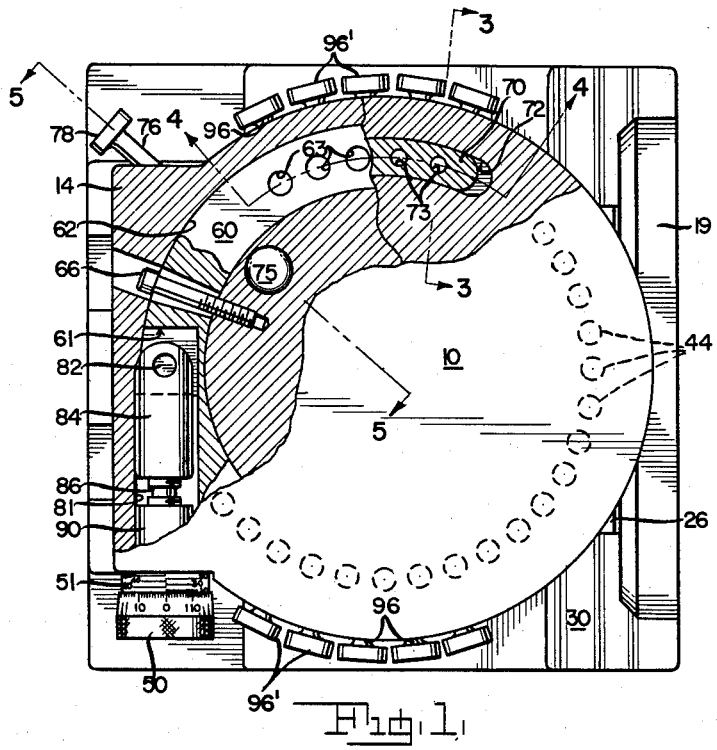
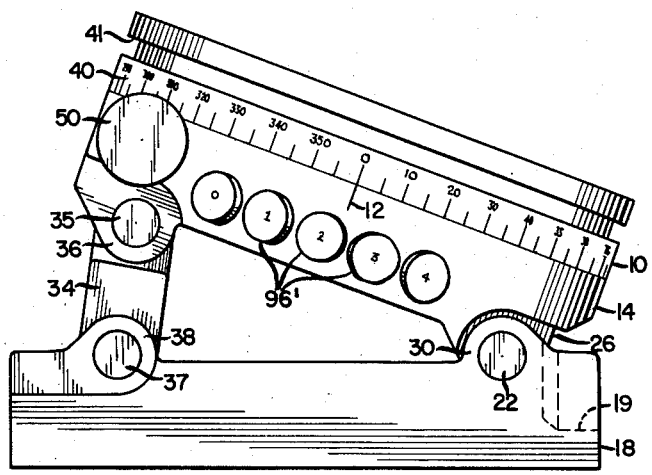
INVENTOR.
MAURICE PREFONTAINE
BY *Kenwood Ross*
ATTORNEY.

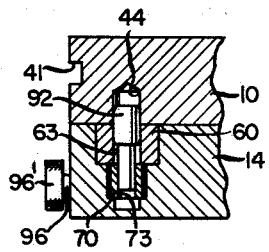
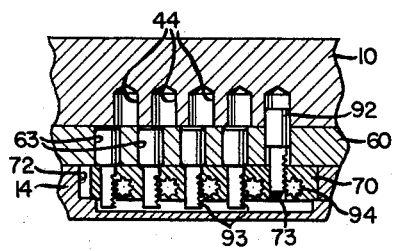
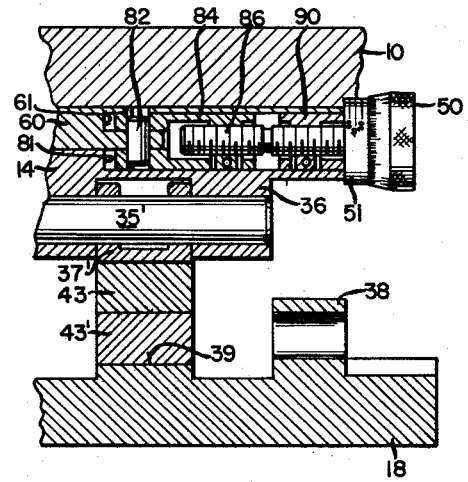
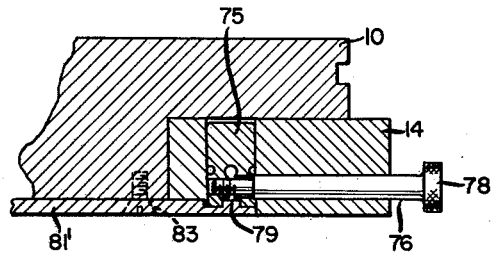
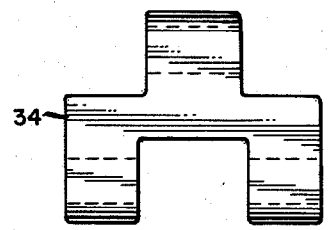
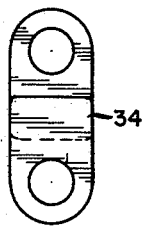
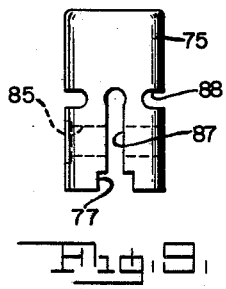

Nov. 13, 1962  M. PREFONTAINE  3,063,155
COMBINATION SINE BAR AND INDEXING ROTARY TABLE
Filed Jan. 6, 1961  3 Sheets-Sheet 3

*INVENTOR.*
MAURICE PREFONTAINE
BY Kenwood Ross
*ATTORNEY.*

United States Patent Office 3,063,155
Patented Nov. 13, 1962

3,063,155
COMBINATION SINE BAR AND INDEXING
ROTARY TABLE
Maurice Prefontaine, 369 School St., Agawam, Mass.
Filed Jan. 6, 1961, Ser. No. 81,019
6 Claims. (Cl. 33—174)

The present invention relates to new and useful improvements and structural refinements in an indexing machine comprising a rotatable indexing table and a fine adjustment mechanism therefor and a sine plate wherein the indexing table, adapted to carry one or more workpieces, is rotatable relative to a sub-table and is successively indexed from one work position or station to another to permit an independently operated work machine to perform a work operation on the workpiece at any selected indexed position. The underportion of the indexing table is provided with a plurality of indexing pin recesses which extend inwardly from the lower planar surface thereof and are equi-spaced from each other and have centers located on a circle concentric with the indexing table. Said recesses are adapted to selectively receive indexing pins carried by the sub-table assembly so as to accurately locate the indexing table at any desired work station.

The invention resides in the particular construction, arrangement, combination, and relationship of the various elements, components and instrumentalities of a combined indexing rotary table, sub-table and sine plate, as exemplified in the detailed disclosure hereinafter set forth wherein the objects of the invention, as defined in the paragraphs below, will be apparent.

It will be helpful to an understanding of my invention to first briefly consider some of the more important features and aspects thereof so that same may be kept in mind during the subsequent reading of the detailed description of the practical embodiments of my improvements and of the illustrations thereof in the annexed drawings.

The present invention has generally to do with an apparatus for use by tool makers and other machinists in accurately positioning and/or laying out work within extremely close tolerances.

The present invention resides in the provision of an easily mastered indexing unit of novel construction with which a large number of widely varied setup problems can be quickly and accurately solved without recourse to the more complicated mechanisms heretofore considered indispensable in tool room and machine shop practice.

In addition to the practical advantages ascribed to my novel construction, it will be observable that one chief feature of the invention resides in the fact that the indexing table is mounted upon and may be rotated freely relative to a sub-table for prelocation at a proper position of alignment between indexing holes and indexing pins, the indexing table being thereafter readily clamped to the sub-table, all to the end of providing an improved and highly efficient indexing table mechanism.

The provision of a machine of small proportions, ruggedness and durability and having a convenience of arrangement of parts have been further desirable features that have been borne in mind in the production and development of the present invention.

Other of the chief objects and purposes hereof are to provide advantageous structural and operational features in such an apparatus to provide a construction having the following inherent meritorious characteristics; first, a simplicity and compactness of design and therefore an adaptability to economical manufacture; second, a uniqueness in engineering design of coacting parts wherefor the components are coordinated for convenient and facile assembly; third, a susceptibility to easy installation with respect to the various purposes to which it is intended; fourth, a high degree of efficiency and dependability in its operational use; fifth, the attainment of a flexibility or a capability of adjustment by which a large variety of work can be produced by means of the same device; sixth, the achievement of a greater ease in repairs and consequent reduction in maintenance costs than has been possible in related devices heretofore known; seventh, the provision of a construction which is well adapted to withstand the usage to which an indexing table is ordinarily subjected, and eighth, the provision of such other improvements in and relating to indexing tables and sine plates as are hereinafter described and claimed.

Another salient object is to provide a method for aligning an indexing table of the character described with its indexing and positioning mechanism whereby the indexing table is first adjustably mounted rotatably relative to its supporting sub-table until it is properly positioned and thereafter positively secured to the sub-table for operational use.

Indexing machines of the character described are usually costly precision mechanisms not readily subject to mass production methods of manufacture. Inasmuch as different manufacturing operations for which the table is suited require different increments of indexing movement of the table, it has long been desirable to achieve an indexing machine which may be utilized with a table adapted for any of the indexing movements ordinarily required in manufacturing operations.

Accordingly, another object of this invention is to provide an indexing machine which may be readily adapted for indexing a table through a plurality of indexing movements for each complete revolution of the table.

Further objects hereof are to provide a structure conformable to the desiderata of the preceding paragraphs and offering specific improvements in the various operating instrumentalities comprising same, so that it is distinctive in its appearance, practical in its value, durable in its organization, reliable in its operation, and efficient in its use.

To the end of attaining these and other objects and advantages, hereinafter reasonably appearing, it will be explained that the invention consists substantially in the combination, construction, location and relative arrangement of parts, as described in detail hereinafter, as shown in the annexed drawings, and as defined with particularity in the appended claims forming a part hereof.

It will be apparent however that the physical embodiment delineated is only indicative of but several of the various ways, albeit the preferred exemplifications, in which the principles of the invention may be employed and in which the component parts may be combined and arranged. Same are submitted as best known embodiments of the invention in accordance with the patent statutes and are given with a view to illustrating and explaining the precise nature of the principles of the invention and their embodiment for practical use, in order that others skilled in the art may be enabled to adapt and modify them in numerous embodiments, variations and modifications, each as may be best adapted to the conditions of any particular use.

The protection which is sought for this invention is covered by the language of the specification and the spirit represented thereby and same is limited only by the prior art and the scope of the appended claims.

These above named objects I accomplish by means of such structure as will fully appear from a perusal of the machine's description which follows and the illustrations in the accompanying drawings, where like characters of reference are employed to designate like or corresponding parts throughout the several views and in which:

FIG. 1 is essentially a top plan view of an indexing apparatus embodying the present invention with portions of certain components being broken away and shown in section to illustrate details of construction;

FIG. 2 is essentially a side elevational view of the apparatus shown in FIG. 1 being diagonated to show the sine features thereof;

FIG. 3 is essentially a sectional view taken in the direction of the arrows along the line 3—3 of FIG. 1;

FIG. 4 is essentially a sectional view taken in the direction of the arrows along the line 4—4 of FIG. 1;

FIG. 5 is essentially a sectional view taken in the direction of the arrows along the line 5—5 of FIG. 1;

FIG. 6 is essentially a fragmentary sectional view taken through the indexing plate adjustment means and showing a block on the sine pin and a plurality of size blocks disposed between the sine plate and the indexing table;

FIGS. 7 and 8 are essentially front and side elevational views respectively of one of the spacer bars employed herein for obtaining various angular positions;

FIG. 9 is essentially a front elevational view of the table locking means of the invention.

Figure 10:
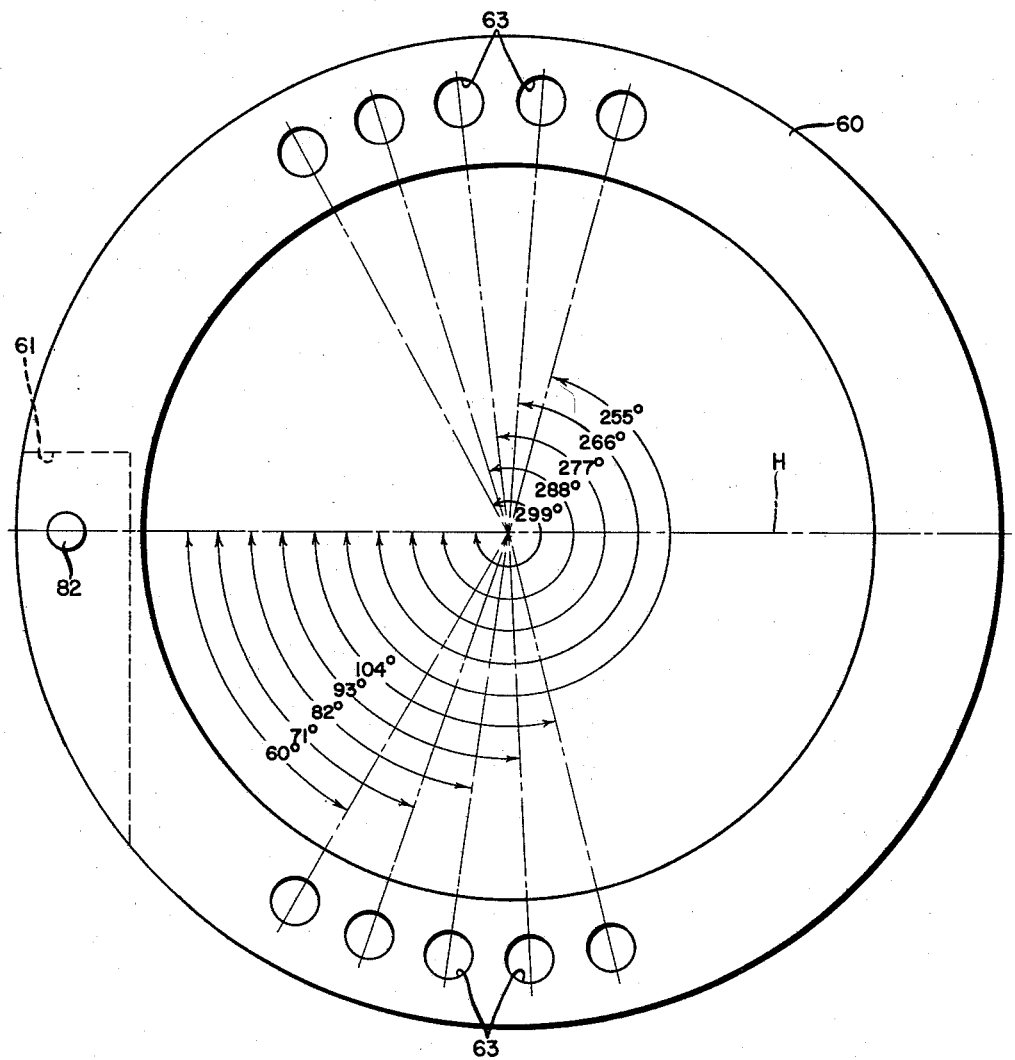
FIG. 10 is essentially a top plan view of the indexing ring of the invention and illustrates the spaced relationship of the indexing openings provided in said ring.

With continued reference now to the drawings, which illustrate a typical and preferred embodiment of the invention for the purpose of disclosure and form a part of this specification, I have shown a rotatable work holding indexing table or plate 10 which is rotatably mounted upon a sub or intermediate stationary table or plate 14, which latter table is positively aligned with and pivotally secured to a sine base plate 18 by means of a horizontally-disposed transversely-extending pivot pin 22 extending through complemental aligned openings in downwardly-depending bosses 26 of sub-table 14 and upwardly-extending bosses 30 of base 18, all at one side of the structure.

A yoke-shaped spacer bar 34 may be disposed between sub-table 14 and base 18 and may be engaged therewith primarily to sub-table 14 by means of a horizontally-disposed transversely-extending pin 35 extending through complemental aligned openings in spacer bar 34 and downwardly-depending bosses 36 of sub-table 14 and secondarily to base 18 by means of a horizontally-disposed transversely-extending pin 37 extending through complemental aligned openings in spacer bar 34 and upwardly-extending bosses 38 of base 18, all at the side of the structure diametrically opposite from the pivot pin 22.

If desired, a plurality of such spacer bars 34 of different predetermined sizes may be provided for use in seriatim as desired and offering a means for spacing indexing table 10 at various degrees of inclination relative to base 18, as for example, a 30° spacer bar for inclining table 10 and base 18 at an angle of 30° as to each other, a 45° spacer bar for inclining table 10 and base 18 at an angle of 45° as to each other, a 90° spacer bar for inclining table 10 and base 18 at an angle of 90° as to each other, etc., etc. Such would serve to provide the various, more commonly required angles in practical use. Other spacer bars of other sizes may be employed, as desired.

It would be explained here that, when a 90° spacer bar is employed herewith, so as to position the indexing table at 90° relative to the base, the structure of the invention has particular usefulness as an angle iron.

Base 18 is preferentially provided with a cradle in the form of a well or recess 19, in which well or recess complemental portions of sub-table 14 and indexing table 10 are nestable as same are pivoted upwardly relative to said base, as will be appreciated by reference to FIG. 2.

Alternatively, in another practical application, spacer bar 34 may be eliminated and sub-table 14 may be directly secured relative to and in a plane parallel with base 18 as by pin 35 which would be accommodated through the complemental horizontally-aligned openings in bosses 36 of sub-table 14 and in bosses 38 of base 18, in manner to offer a straight rotary indexing table wherein the line between the axes of the pins 22 and 35 is parallel to the upper planar face of table 10 and the lower planar face of base 18.

Otherwise alternatively, spacer bar 34 may be eliminated and replaced by a series of gauge or size blocks which may be disposed under a sine pin 35' which may be accommodated through the complemental horizontally-aligned openings in bosses 36 of sub-table 14, as shown in FIG. 6. A pin block 37' may be sleeved upon pin 35', between said bosses 36, for rotative movements relative to said pin 35'. The desired gauge or size block or combination of gauge or size blocks, indicated as 43 and 43' in said FIG. 6, may be disposed in known manner and built upwardly from a ground measuring area 39 on the upper planar surface of base 18 to position said sub-table 14 at any desired angular position relative to said base 18. A lower planar surface of said pin block 37', rotatably mounted upon pin 35', rests upon the upper planar surface of the top most size block 43.

The gauge or sine blocks will be of customary type used for setting sine bars and the like.

The said ground measuring area 39 of base 18 and the said lower planar surface of the companion piece, pin block 37', are each machined to a high degree of flat planar accuracy for precision in operation.

The distance between the axes of the pin 22 and the pin 35' is predetermined, preferably according to the usual sine bar practice, so that any angle desired for the upper surface of the indexing plate to assume can be attained by reference to a table of natural sines and setting or adjusting the angle between indexing plate and sine plate base so that the perpendicular distance between the pin block 37' and the ground measuring surface 39 of base 18 is the proper multiple of the natural sine of the angle to be achieved.

As another exemplification of a practical use of the apparatus, work to be performed upon may be mounted upon sine plate base 18 per se, instead of indexing table 10, in which instance the indexing table would be strapped to the machine instead of the sine plate, as would be normal in operational use. The outer peripheral edge of said indexing table 10 may be provided with an annular inwardly-extending recess 41 for receiving a strap or equivalent clamping means for holding the indexing table securely relative to a machine during operational use, for the aforesaid contemplated use of the sine plate for directly supporting the work.

The outer peripheral edge of indexing table 10 is also provided with a plurality of major indexing indicia of a protractor scale 40 ranging from 0° to 360°. A cooperating indexing or registration point 12 is suitably provided on the outer peripheral edge of sub-table 14 for use therewith as indexing table 10 is rotated relative to sub-table 14 in manner whereby the indicated angle of rotation on protractor scale 40 is brought into registry with the indexing or registration point 12.

The lower planar surface of table 10 is provided with 36 pin recesses 44 extending inwardly from the lower planar surface thereof and having centers located on a circle concentric with the indexing table with the axes of the recesses extending parallel to the indexing table axis, which recesses will be spaced 10° apart from each other and will subsequently be reverted to.

An annular indexing ring 60 is seated in a complemental recess in the upper planar surface of sub-table 14 concentrically-arranged relative to the axis of the indexing table, which indexing ring is adapted to rotate relative thereto on either side of what will be referred to as a dead-center.

For locking said indexing ring to said sub-table, a ring lock 66, extendable through suitably aligned, transversely-extending openings in sub-table 14 and indexing ring 60, is provided. Following the desired or selected positioning of the indexing ring relative to the sub-table, said ring lock 66 may be adjusted as by tightening in manner to secure the two members to each other.

A pair of gear and pin carriers 70, of identical arcuate shape, are each receivable in a complemental recess 72 in sub-table 14, in the recesses of the pair thereof being disposed on opposite sides of sub-table 14.

The recesses 72 are registrable with the indexing ring 60, each of the recesses 72 communicating with recess 62.

A pin-like table lock 75 is disposed in a suitable opening through sub-table 14 and serves to lock table 10 to sub-table 14.

A stem-like locking rod 76 extends transversely relative to said table lock and through a suitable opening in sub-table 14 and is provided at its outer end with a manually engageable locking knob 78.

Table lock 75 is provided with a keyway 77 in its lowermost planar surface which keyway seats on a circumferentially arranged key 79 extending upwardly from an annular thrust washer or bearing 81' fixed to the bottom of table 10 as by screws 83.

The inner extremity of locking rod 76 is threadedly engaged in the threaded portion of a transverse opening 85 extending through table lock 75.

A slot 87 extending upwardly through said table lock from the lower planar surface thereof intersects keyway 77 and opening 85.

Additionally, transversely-and-inwardly-extending circumferentially arranged reliefs 88 may be provided in the annular side wall of the table lock to facilitate the drawing inwardly toward each other of the two oppositely-spaced portions of the table lock as defined by said slot 87.

As locking knob 78 is rotated in a certain direction, locking rod 76, by virtue of its threaded engagement with one of said oppositely-spaced portions, draws the portion toward the other of the oppositely-spaced portions in manner to clamp keyway 77 against key 79 of thrust bearing 81', thus locking table 10 to the sub-table assembly.

An inwardly-extending bore 81 is provided in sub-table 14 in communicating manner with recess 62.

A slot 61 in ring 60 intersects the area defined by the said bore 81.

Said bore 81 receives a toggle nut 84 seated therein and pivotally secured to indexing ring 60 as by a pivot pin 82.

Toggle nut 84 is threadedly engaged with a left hand end of a differential screw shaft 86 (as viewed in FIG. 6) which extends axially of bore 81.

Said screw shaft 86 is disposed inwardly from and is fixed to drum 51 upon which a micrometer input or adjustment knob 50 is sleeved.

A sleeve nut 90 is disposed within said bore 81, is fixed to said sub-table 14 as by any suitable means, and is likewise threadedly engaged with the right hand end of said screw shaft 86 (as viewed in FIG. 6).

The differential screw shaft 86 is provided at its left hand end with threads of one pitch and at its right hand end with threads of a different pitch. One pitch will be relatively coarse and the other pitch will be relatively fine, sufficient to actuate ring 60 in one direction or the other according to the rotation of said screw shaft 86.

The differential screw shaft 86 with its threads of different pitches, the thimble or knob 50 and drum 51, and the sleeve nut 90 constitute the actuating elements of a micrometer caliper. The inner annular end of thimble 50 is provided with graduations and is sleeved over drum 51, as aforesaid, which drum is also provided with graduations along its length, in manner to provide the micrometer features delineating minutes and seconds in 5 second increments.

Rotation of the thimble 50 causes the left hand end (considered to be the left, FIG. 6) to move forward or backward on the drum 51 and over the graduations on the said drum, depending upon the direction of rotation. These graduations, representative of minutes and seconds of degrees, are read and interpolated by reading the graduations on the thimble on the center line of the graduations on the drum, just as in the case of micrometer calipers of well known types.

Assume that differential screw shaft 86 is rotated relative to sleeve nut 90, whereby the screw shaft is moved forwardly the full pitch of said sleeve nut. The screw shaft is likewise threadedly engaged in toggle nut 84, causing it to be moved rearwardly.

Assume too that said sleeve nut 90 is provided with a coarse pitch, and that toggle nut 84 is provided with a fine pitch. The screw shaft, in one turn, will move forwardly relative to sleeve nut 90, say $50/1000$, and will pull the other nut rearwardly by the amount of the pitch thereof, say $49/1000$, wherefor the movement of the toggle nut and of the ring 60 pinned thereto will be the difference of the two movements, or $1/1000$.

The resultant movement of the ring 60 will be the algebraic sum of the two components of linear movement thereof.

In annular ring 60, a total of ten openings 63, five on each side of the ring, are provided, the openings of each set of five being arranged 11° apart as to each other. The openings have centers located on a circle concentric with the sub-table with the axes of the openings extending parallel to the axis of the sub-table and are registrable in seriatim with the recess in the indexing table.

It will be understood that all of the ten openings 63 could, if desired, be arranged together on one side of the ring.

Too, it will be understood that more than ten such openings 63 could be provided, if desired, although as the principle of their use is understood, it will be appreciated that only ten such openings will be required.

Referring to FIG. 10, it will be seen that the openings 63 form two groups, each group being disposed on opposite sides of an imaginary horizontal center line H drawn through the ring 60, and the openings of one group being related to the openings of the other group.

The first opening 63 of the lowermost group as viewed in FIG. 10 is disposed at an angle of 60° relative to the imaginary horizontal center line H, the second opening is disposed at an angle 11° from said first angle, or 71°. The third opening is likewise disposed at an angle 11° from the second opening, or 82°. In like manner, the fourth opening is at an angle of 93° and the fifth opening is at an angle of 104°.

What is significant as to the arrangement of the openings of the uppermost group is that they are related in 11° increments to the same imaginary line H and, of course, to the openings of the first group. That is, one opening is at an angle of 255° from center, another is at an angle of 266° from center, a third is at an angle of 277° therefrom, a fourth is at an angle of 288° therefrom and a fifth is at an angle of 299° therefrom.

The angle formed by each of the openings 63 in each of the groups relative to the center line H is such that the final digit of each angle is representative of a sequence of numerals running from zero through nine, thus corresponding to gear pins 96, to be reverted to shortly, which are also numbered in seriatim from zero through nine.

In each gear and pin carrier 70 on each side of the structure, a group of five vertically-disposed openings 73 are provided. The openings of each group of five are arranged 11° apart as to each other, and are registrable with the adjacent five opening 63 of annular ring 60 disposed thereabove.

In each said opening 73, an index pin 92 is receivable. Each said index pin, at its lower end, is provided with a shank of reduced diameter, said shank being formed with a gear rack 93 on one side thereof. Each said gear rack 93 is meshable with a rotatable pinion 94 fixed on the innermost extremity of a complemental manually-adjustable, horizontally-extendable gear pin 96 extendable into the sub-table from the adjacent side wall thereof and likewise extendable through a complemental transversely-extending opening in gear and rack carrier 70. The gear pin openings in the sub-table are of such dimension as to allow the respective gear pins 96 to be loosely receivable therethrough wherefor the gear pins may move limitedly relative to the sub-table as the gear and pin carrier 70 is moved circumferentially with respect to the sub-table.

Ten of such gear pins 96 are provided, each having a knurled manually engageable knob 96', fixed to its outermost end. Said pins are numbered in seriatim as 0, 1, 2, 3, 4, 5, 6, 7, 8 and 9.

By manual rotation of one of the numbered gear pins 96, through its respective knob 96', the related index pin 92 may be raised to extend into one of the openings 44 in table 10, from one of the openings 63 in ring 60 registrable therewith.

In operation and use, when one of the openings 63 of indexing ring 60 is in register with one of the openings 44 of plate 10, each of the remaining nine openings of ring 60 will be understood to be out of register as to the adjacent openings 44.

The apparatus may be indexed to any point from 0° to 360°, in 1° increments, and at any given setting of the thimble 50.

To effectuate an adjustment of indexing table 10 to, say, 4°25'10", table 10 is first rotated manually to the position where the 4° reading on protractor 40 aligns with the registry indicator 12.

Then, the #4 gear knob 96' is rotated so as to cause the index pin to be raised into the appropriate recess.

In this manner, table 10 is now indexed precisely at 4° and is mechanically engaged to annular ring 60.

Any movement of said annular ring now causes said table to move accordingly.

Therefor, by a rotation of micrometer knob 50 to a reading of 25'10", the table is moved an additional 25'10".

By way of further example, let us assume that it is desired to engage the zero index pin 92 into index table 10. Let us assume that table protractor 40 is first set at zero.

It will be observed that the index openings 44 of table 10 are arranged 10° apart wherefore it is possible to index said table in 10° increments by using the "zero" knob 96' only for index positions. Therefore, all protractor readings ending in zero will be readable with the zero knob 96'.

By rotating said table 10 one degree, it is possible to engage the index pin 92 into its recess in the table, by movement of "#1" knob 96', as it will be aligned with said recess.

With table 10 now indexed at a one degree position, it will be noted that the table, by being rotated 10 degrees more at 11°, the #1 knob will also index at 21°, 31°, 41°, etc., etc. (i.e. any degree ending in 1). The other pins will operate in the same manner. It will be noted that, on the turning of the table to any protractor setting, the last digit of said setting will indicate which numbered knob will be aligned for engaging the index pin.

If a setting is required in minutes and seconds, such as 3°15'25", the table is rotated to 3° and the number 3 knob is turned to engage the pin in the table recess, and then the micrometer dial is turned to read 15'25". This action of the micrometer drives the table around to the final adjustment.

It is believed that the gist of the invention will be clearly understood from the foregoing disclosure and accordingly, further analysis thereof at this point is considered unnecessary, as I have, in accordance with the provisions of the patent statutes, described the construction and principle of operation of my invention together with the apparatus which I believe to represent the best embodiment thereof, to the end that others can, by applying current knowledge, readily adapt it for various applications without omitting features which, from the standpoint of prior art, fairly constitute essential characteristics of its generic and/or specific aspects. The substitution of equivalents and other changes, modifications and alterations as circumstances may suggest or render expedient, are reasonably contemplated, the invention being susceptible of such without departing from its real spirit or underlying principles.

The claims are desired to include within the scope thereof all of said suitable variations, modifications and equivalents by which substantially the results of the invention may be obtained through the use of substantially the same or equivalent devices or means. Accordingly, limitation hereof should only be made as determined by a proper interpretation of the prior art and the scope of the subjoined claims, in which it is my intention to claim all novelty inherent herein as broadly as possible.

I therefore particularly point out and distinctly claim as my invention:

1. In an indexing mechanism, the combination of: a circularly-cylindrical indexing table; a generally circularly-cylindrical supporting sub-table having an indexing table supporting surface provided with an annular recess concentrically-arranged relative to the axis of said indexing table, said indexing table being rotatably supported on said sub-table; said indexing table carrying a peripherally-arranged master indexing scale delineating a plurality of uniformly-spaced major indexing indicia extending through 360° and being selectively registrable relative to a registration point on the peripheral edge of said sub-table; an annular indexing ring nestable in the recess in said sub-table and being incrementally rotatable relative thereto; said subtable being provided with an arcuate carrier recess registrable and communicative with the recess in said sub-table; said indexing table being provided with a set of pin recesses extending inwardly from the lower planar surface thereof and equi-spaced 10° from each other and having centers located on a circle concentric with said indexing table with the axes of the recesses extending parallel to the axis of said indexing table, said indexing ring being provided with a set of pin openings equi-spaced 11° from each other and having centers located on a circle concentric with said sub-table with the axes of the openings extending parallel to the axis of said sub-table and being registrable in seriatim with the recesses in said indexing table, an arcuate gear and pin carrier slidably receivable in the arcuate carrier recess in said sub-table and being provided with a set of arcuately-arranged pin openings equi-spaced 11° from each other and having centers located on a circle concentric with said sub-table with the axes of the openings extending parallel to the axis of said sub-table and being registrable with the openings in said indexing ring, a set of index pins each including a gear rack and being movably receivable in one of a pair of aligned pin openings of said gear and pin carrier and indexing ring, a set of gear pins each being extendable through an opening in said indexing plate and including a pinion meshable with the gear rack of its respective of said index pins for adjusting the relative position the respective of said index pins, one of said index pins being positionable in one of the index pin recesses of said indexing table upon rotation of said indexing table to bring any desired index pin recess into axial registration with the index pin openings of said gear and pin carrier and indexing ring accommodating the said one of the index pins.

2. In the indexing mechanism as set forth in claim 1, including, clamping means for selectively clamping said indexing and sub-tables together.

3. In the indexing mechanism as set forth in claim 1, inclusive of an angle computing means comprising, a supporting base having a ground area on the upper surface thereof and having upwardly extending spaced-apart arms to provide axially-aligned bearings, said sub-table having coaxial trunnions journaled in the bearings of said supporting base to provide for turning movements of said sub-table about an axis parallel to the plane surface of said supporting base, means for precisely selecting the angular position of said sub-table with respect to said supporting base, means for clamping said sub-table to said base in any adjusted position and being capable of securing said journals in their bearings in adjusted positions to enable said sub-table to be held at any compound angle as determined by said selecting means, said selecting means comprising block type measuring instrumentalities supportable upwardly of on said base bar in flat contacting relationship to its ground surface to accurately measure the distance from said sub-table to said surface to determine the angular position of said sine plate and work fixed to said indexing plate.

4. Means as described in claim 1, and being further characterized by, a bifurcated table lock receivable within and having a main axis parallel to the axis of said sub-table and having a keyway, a bearing fixed to the lower planar surface of said indexing table and having an upwardly extending key having its center line located on a circle concentric with said indexing table, a locking rod threadedly engaged with one of the bifurcations of said table lock for drawing the bifurcations toward each other for clamping the keyway of said table lock against the key of said bearing for locking said indexing table to sub-table.

5. In the indexing mechanism as set forth in claim 1, inclusive of a sub-divisional indexing means comprising, a toggle nut slidably mounted within and relative to said sub-table and being swivably connected to said indexing ring for imparting rotative movement to said indexing ring, a differential screw shaft having an outboard portion extending outwardly of said sub-table and an inboard portion receivable within said sub-table and having first and second threaded portions of different characteristics with the first threaded portions being threadedly engaged relative to said sub-table and with the second threaded portion being threadedly engaged relative to said toggle nut, a drum secured to the outboard portion of said screw shaft and having linearly proportional scale graduations provided along the axis thereof, an input thimble sleeved upon said drum and having linearly proportional scale graduations around the peripheral edge thereof and being rotatable through a desired arc as determined by relative reading of the scale graduations on said thimble and drum for effectuating rotation of said screw shaft and motivation of said toggle nut and incremental rotation of said indexing ring an ascertainable extent.

6. In the indexing mechanism as set forth in claim 5, including, adjustable locking means for selectively locking said indexing ring and sub-table together for rotation as a unit.

References Cited in the file of this patent

UNITED STATES PATENTS

| | | |
|---|---|---|
| 1,927,675 | Andrews | Sept. 19, 1933 |
| 2,342,539 | Gorton | Feb. 22, 1944 |
| 2,373,578 | Lewis | Apr. 10, 1945 |

OTHER REFERENCES

American Machinist, January 22, 1931, pp. 168, 169. (Photocopy in 33/174 TB.)